United States Patent [19]
Dong

[11] Patent Number: 5,992,029
[45] Date of Patent: Nov. 30, 1999

[54] AUTOMATIC LASER PLUMB LINE

[76] Inventor: Dawei Dong, P.O. Box 4697, Santa Clara, Calif. 95056

[21] Appl. No.: 08/911,129

[22] Filed: Aug. 14, 1997

[51] Int. Cl.[6] .............................. G01B 11/26; G01C 15/10
[52] U.S. Cl. ................................ 33/227; 33/283; 33/281; 33/286; 33/391; 33/DIG. 21
[58] Field of Search .............................. 33/227, 281, 282, 33/283, 285, 286, 391, 392, 402, DIG. 21, 366.11, 366.24, 366.27

[56] References Cited

U.S. PATENT DOCUMENTS

| | | | |
|---|---|---|---|
| 3,911,588 | 10/1975 | Ohneda | 33/227 |
| 3,936,197 | 2/1976 | Aldrink et al. | 356/250 |
| 4,206,550 | 6/1980 | Boyett et al. | 33/227 |
| 4,517,749 | 5/1985 | Scotto | 33/286 |
| 4,852,265 | 8/1989 | Rando et al. | 33/227 |
| 5,012,585 | 5/1991 | DiMaggio | 33/227 |
| 5,509,209 | 4/1996 | Swierski | 33/227 |
| 5,572,796 | 11/1996 | Breda | 33/285 |
| 5,782,003 | 6/1998 | Bozzo | 33/285 |

*Primary Examiner*—Christopher W. Fulton
*Attorney, Agent, or Firm*—The Kline Law Firm

[57] ABSTRACT

A laser line device suitable for construction. The laser line instrument automatically aligns a vertical laser beam so that the beam is perpendicular to the earth's core. The laser module is connected to a pendulum which serves to automatically level the device. The pendulum is damped by permanent magnets. The bearing on which the pendulum is mounted serves as a portion of the electrical circuit of the device.

4 Claims, 4 Drawing Sheets

AUTOMATIC LASER PLUMB LINE

BACKGROUND OF THE INVENTION

The present invention relates generally to construction tools, and more particularly is an automatic laser linear instrument. The device automatically produces a standard plumb line.

Many years have passed since the laser was introduced into the construction industry. Rotary laser levels are the latest generation of instruments effectively used in construction projects. However, the laser level has not achieved widespread adoption by the general public despite the time savings provided by the instrument due to its initial cost of ownership. Only those who are regularly granted large construction projects can justify purchasing a rotary laser device.

The present invention aims at the market of ordinary workers and do-it-yourself builders. In other words, it is affordable to the public. The device is not only ingeniously constructed, but is also easy to carry about and use. The device is operated by simply placing it on the ground and turning on the switch. The device will automatically produce a standard laser plumb line. This plumb line is very useful in construction for jobs such as adjusting walls, installing drop ceilings, mounting cabinets, erecting doors and windows, etc.

SUMMARY OF THE INVENTION

The present invention, an automatic laser plumb line, is formed to resemble a desk clock. In the interior of the device, a bronze pendulum is suspended. On the top of the pendulum there is a unique bearing inserted into a hole in the plastic case, which allows the pendulum to swing freely. Under the bearing is an ordinary solid laser diode module. A lens of a straight-line generator is mounted in front of the diode module. When two AA 1.5 v batteries are connected, the diode module will produce a laser dot that goes through the lens of the straight-line generator and becomes a straight line.

A long bronze screw on the pendulum to adjust its swing arc. The pendulum swings in the magnetic field of a permanent magnet. The magnetic field functions as a damper, which stops the swinging of the pendulum rapidly and steadies the laser plumb line.

The adjusted laser line is perpendicular to the earth's core. Even when the automatic laser plumb is placed on a slope of about 10 degrees, its pendulum automatically stops swinging in seconds, and the device will produce a standard plumb line. The user can use this plumb line as the basis for his work.

DETAILED DESCRIPTION OF THE PREFERRED EMBODIMENT

Figure 1A:
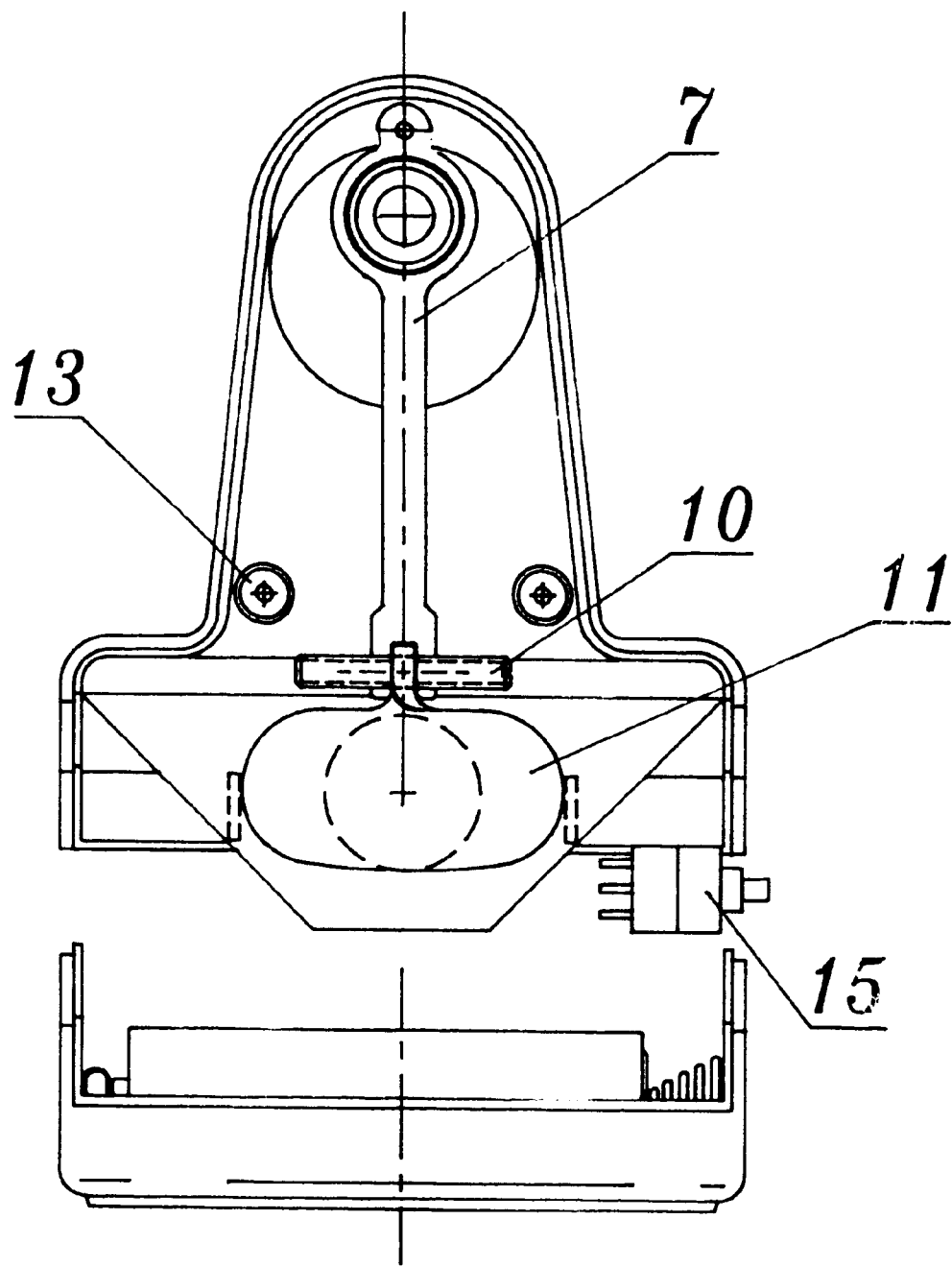
FIG. 1A is a front view of the automatic laser plumb line of the present invention.
Figure 1B:
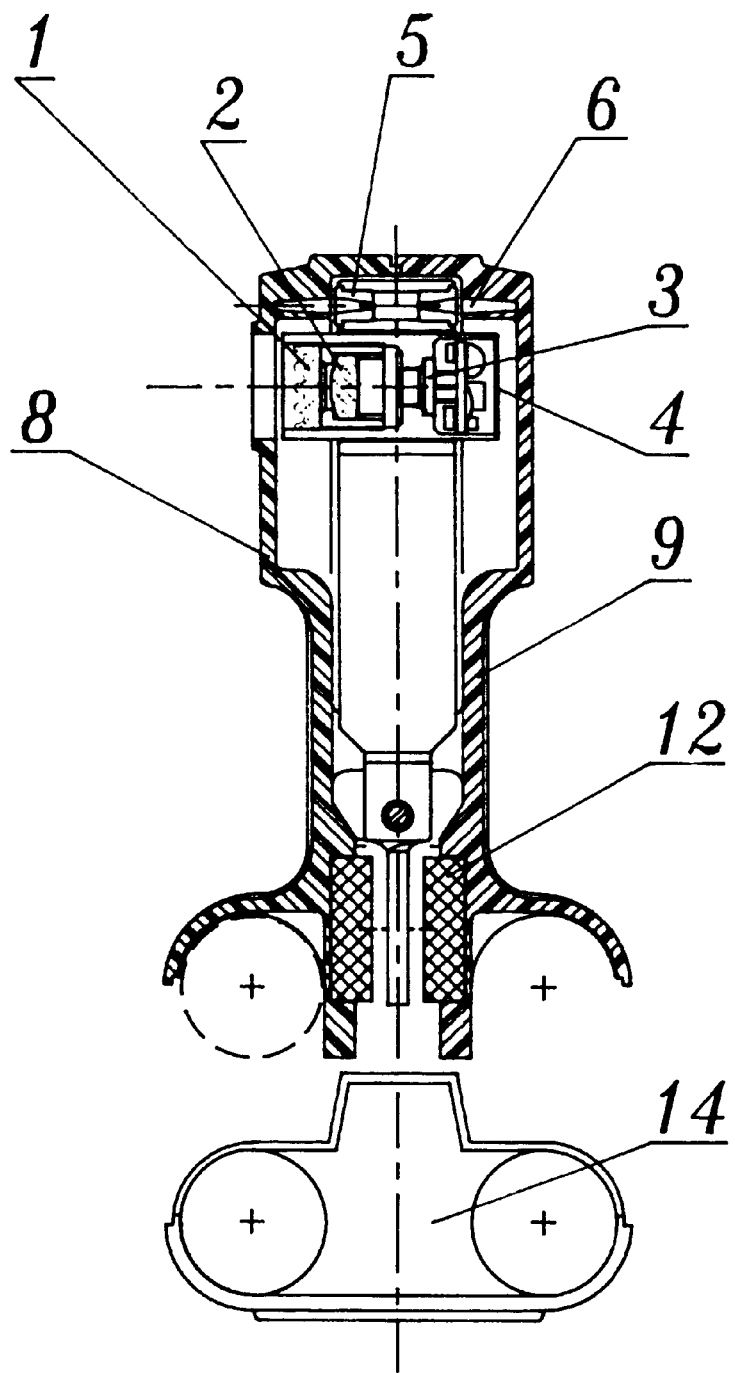
FIG. 1B is a side cross section view.
Figure 1C:
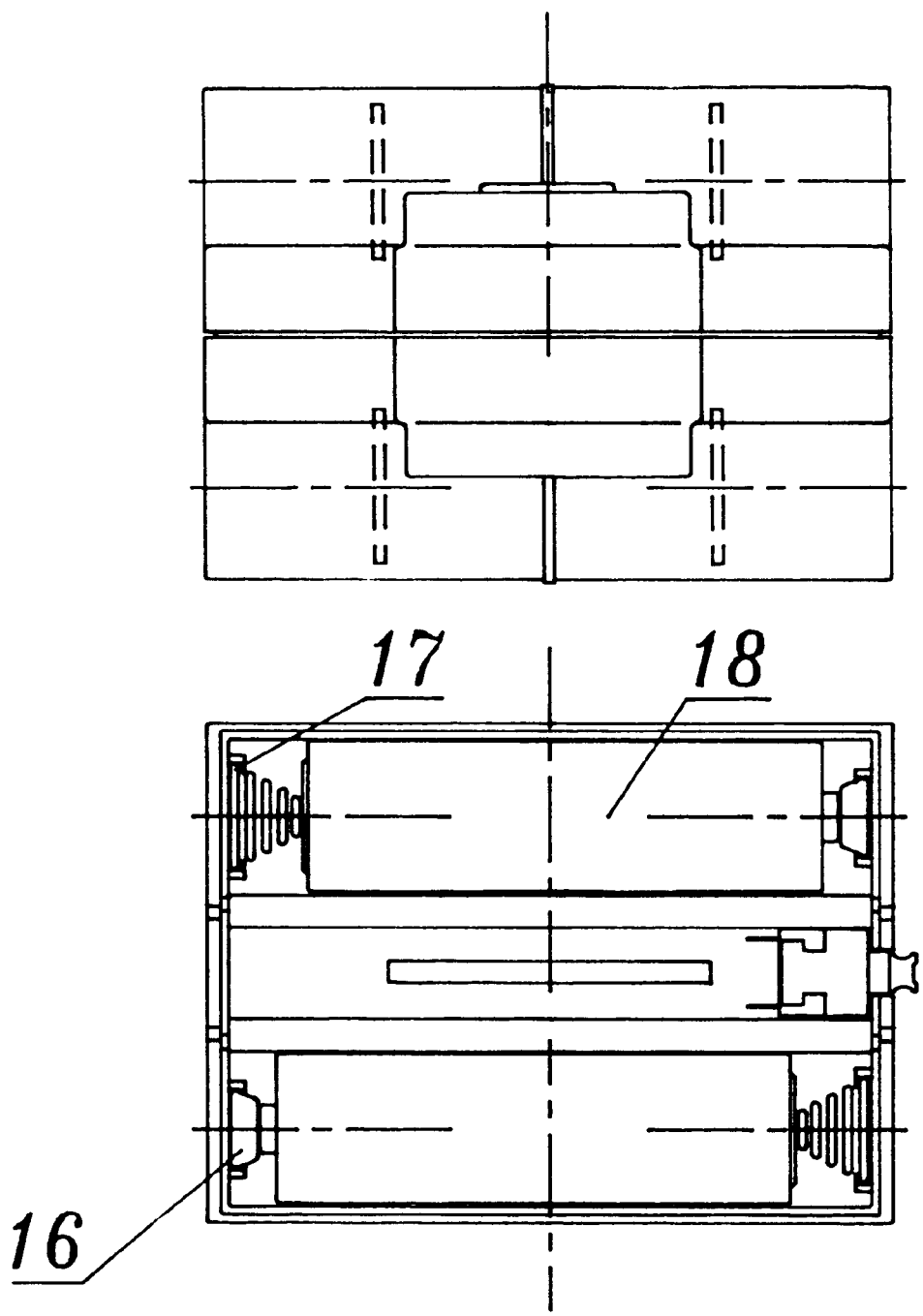
FIG. 1C is a partially exploded top view.
Figure 2:
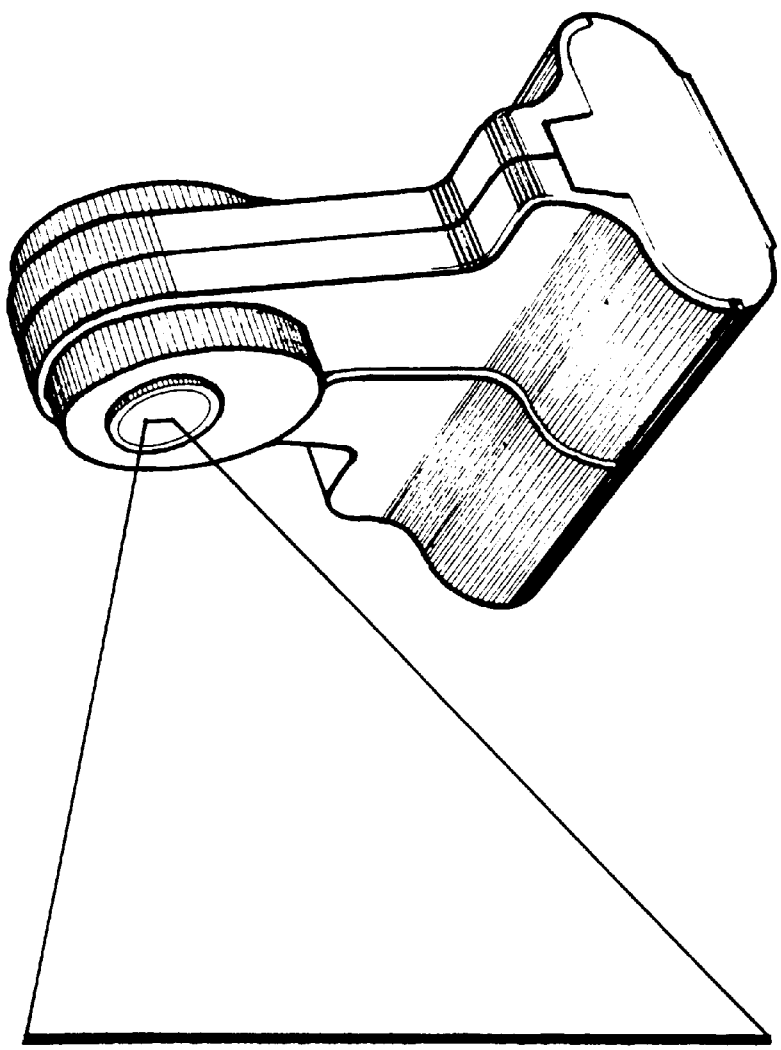
FIG. 2 illustrates the exterior of the automatic laser plumb line.

The present invention is an automatic laser plumb line. The device comprises a laser line generator module 4 mounted on a pendulum. The laser line generator 4 comprises an optical generator lens 1, a focusing lens 2, and a laser diode module 3. The laser line generator module 4 produces a line of visible light that serves as the plumb line.

The laser line generator module 4 is mounted at an upper end of a pendulum. The pendulum arm 7 is made of plastic, but the pendulum body 11 must be made from a material that is subject to a magnetic force. In the preferred embodiment, the pendulum body 11 is made of bronze or copperplate.

The pendulum body 11 must be subject to magnetic force to allow the automatic damping mechanism of the device to function. Ceramic permanent magnets 12 are positioned around the pendulum body 11. In the preferred embodiment, two magnets 12 are used, one in front of the pendulum body 11, and one behind. The magnets 12 damp the swinging of the pendulum after the device has been placed in position. The powerful magnets very rapidly stop the movement of the pendulum, and leave the laser line generator in position to generate the plumb line. If the line generated is not plumb, the user can adjust the at-rest position of the pendulum with an adjustment screw 10 to ensure a perfectly perpendicular plumb line.

The pendulum is hung from a central bearing 5 made of bronze. The central bearing 5 is mounted on needle bearings 6. The bearing system of the present invention is very important to the function, and is unique in the art. In addition to providing an excellent pendulum mounting point, the needle bearings 6 also serve as part of the electrical circuit of the device.

The bearings 6 provide the positive and negative contacts (the anode and the cathode) for the circuit of the laser line generator module 4. This arrangement eliminates the need for wires extending from the laser line generator module 4. This makes the functioning of the pendulum far more efficient and reproducible, as typical flexible wires affect the balance of the pendulum. Wires tend to change position as the pendulum moves, and therefore change the balance of the pendulum.

The components of the device are contained within a housing that will be made from plastic in the preferred embodiment. The housing comprises a front section 8 and a back section 9 held together by fasteners 13. The lower portion of the housing includes a power supply case 14. In the preferred embodiment, the power supply is batteries 18. The power supply case 14 includes positive 16 and negative 17 electrical contacts, and an on/off switch 15 to operate the device.

In operation, the automatic laser plumb line device is simply turned on and placed on a convenient surface. The surface does not need to be absolutely flat, as the damping mechanism in the device will quickly bring the pendulum into the proper vertical position. The laser line generator creates a vertical line that serves as a plumb line for the user to begin his project.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

What is claimed:

1. An automatic laser plumb line generating device comprising:
   a laser line generator module mounted on a pendulum, said pendulum is suspended in a housing means,
   a pendulum swing damping mechanism, and
   an electrical power supply; wherein a rigid suspending means affixed to said housing means supports said pendulum, said suspending means provides positive and negative contacts for a power supply circuit of said laser line generator module, thereby eliminating any need for wires to extend from said laser line generator module, which reduces variation in a swing path of said pendulum.

2. The automatic laser plumb line generating device claimed in claim 1 wherein:

said pendulum swing damping mechanism is a magnetic field applied around an at-rest position of a pendulum body, said pendulum body being formed from a material subject to magnetic force.

3. The automatic laser plumb line generating device claimed in claim 2 wherein:

said pendulum includes an adjustment means to adjust said at-rest position of said pendulum body, thereby ensuring that a true plumb line is produced.

4. The automatic laser plumb line generating device claimed in claim 1 wherein:

said pendulum includes an adjustment means to adjust an at-rest position of said pendulum, thereby ensuring that a true plumb line is produced.

* * * * *